(12) United States Patent  
Kifuku

(10) Patent No.: US 6,397,971 B1
(45) Date of Patent: Jun. 4, 2002

(54) ELECTRICALLY POWERED STEERING SYSTEM

(75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,571

(22) Filed: Apr. 19, 2000

(30) Foreign Application Priority Data

Dec. 16, 1999 (JP) .......................................... 11-357270

(51) Int. Cl.[7] ................................................. B62D 5/04
(52) U.S. Cl. ...................................... 180/443; 180/446
(58) Field of Search ................................ 180/404, 400, 180/443, 446, 412, 422

(56) References Cited

U.S. PATENT DOCUMENTS

| | | | | |
|---|---|---|---|---|
| 4,956,590 A | * | 9/1990 | Phillips | 318/432 |
| 4,972,320 A | * | 11/1990 | Sugiura et al. | 701/43 |
| 4,984,647 A | * | 1/1991 | Morishita et al. | 180/446 |
| 5,740,040 A | * | 4/1998 | Kifuku et al. | 701/41 |
| 5,878,360 A | * | 3/1999 | Nishino et al. | 701/41 |
| 6,029,767 A | * | 2/2000 | Kifuku | 180/443 |
| 6,094,021 A | * | 7/2000 | Noro et al. | 318/138 |
| 6,102,151 A | * | 8/2000 | Shimizu et al. | 180/446 |
| 6,112,846 A | * | 9/2000 | Mukai et al. | 180/446 |
| 6,131,692 A | * | 10/2000 | Kawasuji | 180/446 |
| 6,161,068 A | * | 12/2000 | Kurishige et al. | 701/41 |

FOREIGN PATENT DOCUMENTS

| | | | |
|---|---|---|---|
| JP | 7-96387 | 10/1995 | ............ B62D/5/04 |
| JP | 411147479 | * 2/1999 | |

\* cited by examiner

*Primary Examiner*—J. J. Swann
*Assistant Examiner*—Christopher Bottorff
(74) *Attorney, Agent, or Firm*—Sughrue Mion, PLLC

(57) ABSTRACT

An electrically powered steering system includes an electric motor for assisting a steering force based on a steering torque; and an electric motor driving circuit for driving the electric motor based on at least one of an inertia compensation current and a viscosity compensation current in case of failure. The inertia compensation current becomes greater as the electric motor has an angular acceleration increased and provides the electric motor with a torque in a direction identical to the electric motor angular acceleration. The viscosity compensation current becomes greater as the electric motor has an angular speed increased and provides the electric motor with a torque in a direction opposite to the electric motor angular speed.

19 Claims, 9 Drawing Sheets

*1 LEFT  *2 RIGHT
*3 ENERGIZING DIRECTION

ELECTRICALLY POWERED STEERING SYSTEM

The present invention relates to an electrically powered steering for automobiles and the like, in particular to the improvement in steering feeling in case of failure.

In FIG. 10 shows a typical electrically powered steering system. In FIG. 10, reference numeral 100 designates an electric motor, which generates a steering assisting force, which connected between the output terminals of a motor driving circuit 110 comprising a bridge circuit of four FETs 110a to 110d, and which is controllably driven when a drive unit 120 turns on one of the opposed pairs of FETs in the motor driving circuit 110. In such a typical electrically powered steering system, when the FET 110c, for instance, causes a short circuit, a closed circuit is formed between the FET 110c, the motor, a parasitic diode in the FET 110d and the FET 110c. When a drive operates the steering wheel, the motor 100 is rotated by a steering shaft through a speed reducer to induce an electromotive force in the motor 100. Since a large current flows in the closed circuit, the closed circuit works as a braking circuit to require the driver to apply an excessive steering force, which deteriorates the driving operation.

When the motor is reversely rotated in such a state that the FET 110c has caused short circuit as stated earlier, no braking action is provided since no current flows because of the absence of the closed circuit. This means that the braking force, or the required steering force, becomes different, depending on the steering directions. Since the steering force in the right direction and that in the left direction become unbalanced, the steering feeling extremely deteriorates.

In order to cope with this problem, there has been provided a proposal as disclosed in JP-B-796387. Now, a conventional electrically powered steering system will be explained, referring to FIG. 11. In this Figure, parts identical to those shown in FIG. 10 are designated by the same reference numerals, and explanation of these parts will be omitted.

As shown in FIG. 11, the motor 100 is connected to the output terminals of the motor driving circuit 110 through a relay 130.

When the FET 110c causes a short circuit as stated earlier, this conventional powered steering system opens the relay 130 to prevent a closed circuit or braking circuit from being provided, preventing the steering feeling from being deteriorated.

Although this conventional electrically powered steering system can open the relay 130 in case of failure to prevent the braking circuit from being provided, the electrically powered steering system has created a problem in that the behavior of the vehicle becomes unstable under the influence of the moment of inertia of the motor 100 since the motor 100 is coupled to the steering shaft through the speed reducer.

It is an object of the present invention to solve this problem, and to provide an electrically powered steering system capable of making the behavior of a vehicle stable to provide good steering feeling even in case of failure.

According to a first aspect of the present invention, there is provided an electrically powered steering system comprising an electric motor for assisting a steering force based on a steering torque, and an electric motor driving circuit for driving the electric motor based on an inertia compensation current in case of failure, wherein the inertia compensation current becomes greater as the electric motor has an angular acceleration increased and provides the electric motor with a torque in a direction identical to the electric motor angular acceleration.

According to a second aspect of the present invention, there is provided an electrically powered steering system comprising an electric motor for assisting a steering force based on a steering torque, and an electric motor driving circuit for driving the electric motor based on a viscosity compensation current in case of failure, wherein the viscosity compensation current becomes greater as the electric motor has an angular speed increased and provides the electric motor with a torque in a direction opposite to the electric motor angular speed.

According to a third aspect of the present invention, there is provided an electrically powered steering system comprising an electric motor for assisting a steering force based on a steering torque, and an electric motor driving circuit for driving the electric motor based on an inertia compensation current and a viscosity compensation current in case of failure, wherein the inertia compensation current becomes greater as the electric motor has an angular acceleration increased and provides the electric motor with a torque in a direction identical to the electric motor angular acceleration, and wherein the viscosity compensation current becomes greater as the electric motor has an angular speed increased and provides the electric motor with a torque in a direction opposite to the electric motor angular speed.

According to a fourth aspect of the present invention, the electric motor is prohibited from operating when failure occurs at the electric motor or the circuit.

According to a fifth aspect of the present invention, the system further comprises a vehicle speed sensor for detecting a vehicle speed, wherein the compensation current is modified in response to the detected vehicle speed.

According to a sixth aspect of the present invention, the compensation current becomes greater as the vehicle speed increases.

According to a seventh aspect of the present invention, the compensation current is determined based on a preset vehicle speed in case of failure at the vehicle speed sensor.

According to an eighth aspect of the present invention, there is provided an electrically powered steering system comprising an electric motor for assisting a steering force based on a steering torque, an electric motor driving circuit for driving the electric motor, the circuit comprising a bridge circuit including four switching devices, and the circuit having the motor connected between output terminals thereof through a resistor, and a switch for short-circuiting both ends of the resistor in normal operation.

According to a ninth aspect of the present invention, the system further comprises a vehicle speed sensor for detecting a vehicle speed, wherein the resistor has a value of resistivity modified in response to the detected vehicle speed.

According to a tenth aspect of the present invention, the value of resistivity becomes smaller as the vehicle speed increases.

According to an eleventh aspect of the present invention, the value of resistivity is determined based on a preset vehicle speed in case of failure at the vehicle speed sensor.

According to a twelfth aspect of the present invention, there is provided an electrically powered steering system comprising an electric motor for assisting a steering force based on a steering torque, and a switch for short-circuiting both terminals of the electric motor, wherein the switch is driven by a duty signal in case of failure.

According to a thirteenth aspect of the present invention, the system further comprises a vehicle speed sensor for detecting a vehicle speed, wherein the duty signal for driving the switch has a duty ratio modified in response to the detected vehicle speed.

According to a fourteenth aspect of the present invention, the duty ratio becomes greater as the vehicle speed increases.

According to a fifth aspect of the present invention, the duty ratio is determined based on a preset vehicle speed in case of failure at the vehicle speed sensor.

According to a sixteenth aspect of the present invention, the system further comprises an alarm for warning that failure occurs in case of failure.

In accordance with the first aspect, an adverse effect by the moment of inertia of the motor can be compensated even in the case of failure to make the behavior of the vehicle stable and improve steering feeling.

In accordance with the second aspect, an adverse effect on steering feeling by the viscosity of the motor can be compensated even in case of failure to make the behavior of the vehicle stable, improving steering feeling.

In accordance with the third aspect, adverse effects by the moment of inertia and by the viscosity of the motor can be compensated even in case of failure to make the behavior of the vehicle stable, improving steering feeling.

In accordance with the fourth aspect, when the continuation of the operation of the motor can lead to burning because of failure, the operation of the motor can be stopped to provide the electrically powered steering system with further improved safety.

In accordance with the fifth aspect, the degree of compensation in the inertia or the viscosity can be modified in response to the detected vehicle speed to further improve steering feeling.

In accordance with the sixth aspect, the viscosity or the inertia can be more greatly compensated in a high speed region to make the behavior of the vehicle stable, further improving steering feeling.

In accordance with the seventh aspect, sufficient compensation can be provided even in case of failure, improving steering feeling.

In accordance with the eighth aspect, when the system is in normal operation, the resistor can be short-circuited to prevent the driving circuit from being adversely affected. When failure occurs in the system, the resistor can work as a braking resistor to give a braking force to the motor, preventing the behavior of the vehicle from deteriorating because of the moment of inertia of the motor, and improving steering feeling even in case of failure.

In accordance with the ninth aspect, the braking force, which is applied to the motor, can be modified in response to the detected vehicle speed to further improve steering feeling.

In accordance with the tenth aspect, the system can apply a greater braking force to the motor in a high speed region to make the behavior of the vehicle stable, further improving steering feeling.

In accordance with the eleventh aspect, a sufficient braking force can be applied even in case of failure, improving steering feeling.

In accordance with the twelfth aspect, when failure occurs in the system, a braking force can be applied to the motor so as to prevent the behavior of the vehicle from deteriorating because of the moment of inertia, improving steering feeling even in case of failure, and offering an advantage in that the system can be made smaller and economical because of no need for an additional part, such as a resistor for braking.

In accordance with the thirteenth aspect, the braking force, which is applied to the motor, can be modified in response to the detected vehicle speed to further improve steering feeling.

In accordance with the fourteenth aspect, the system can apply a greater braking force to the motor in a high speed region to make the behavior of the vehicle stable, further improving steering feeling.

In accordance with the fifth aspect, a sufficient braking force can be applied even in case of failure, improving steering feeling.

In accordance with the sixteenth aspect, in case of failure, a warning can be provided to the driver, providing the electrically powered steering system with further improved safety.

EMBODIMENT 1

Figure 1:
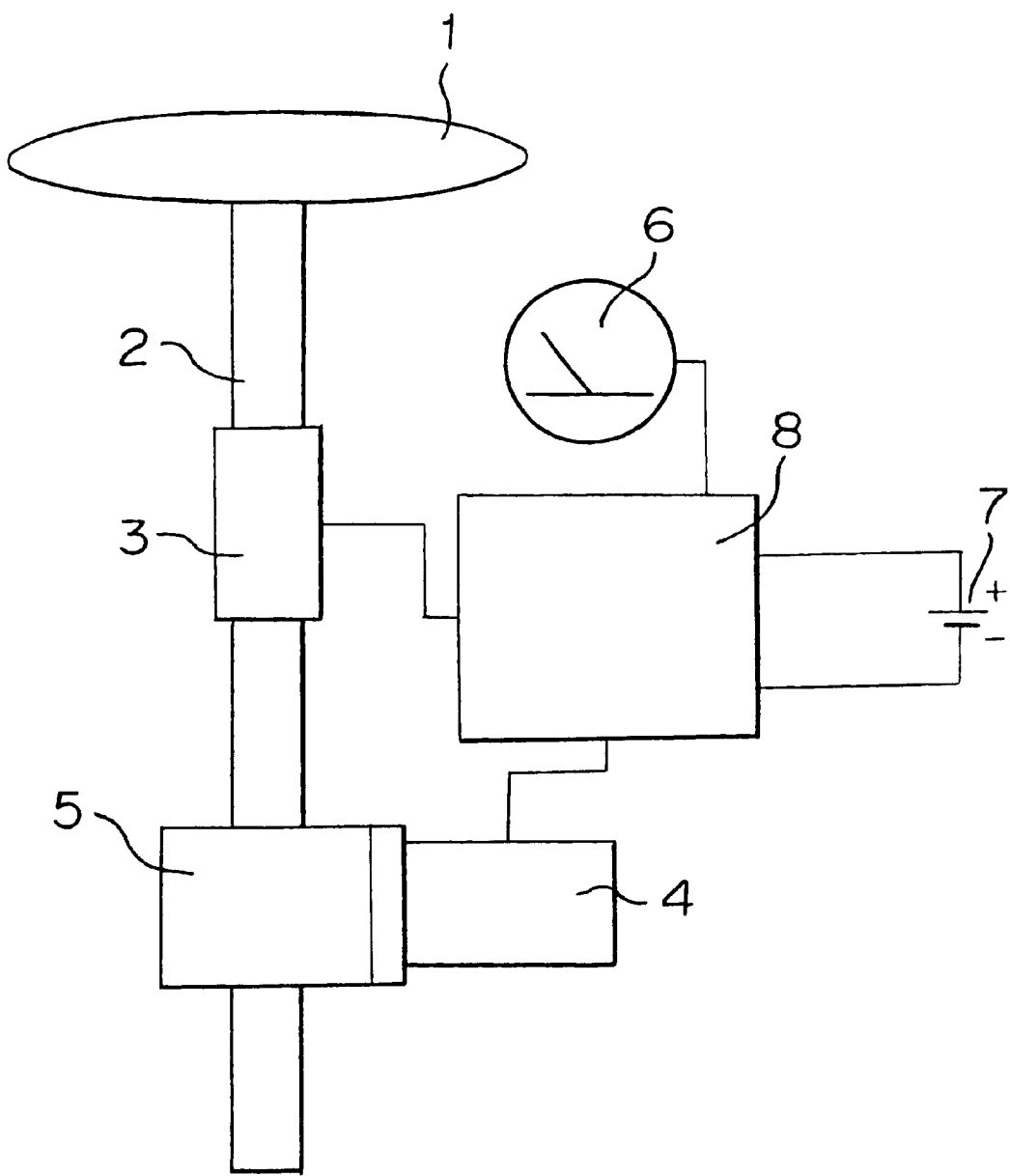
FIG. 1 is a schematic view of the electrically powered steering system according to a first embodiment of the present invention.

Now, the electrically powered steering system according to a first embodiment of the present invention will be described, referring to the accompanying drawings. In FIG. 1, reference numeral 1 designates a steering wheel, reference numeral 2 designates a steering shaft, reference numeral 3 designates a torque sensor for detecting a steering force applied by a driver, reference numeral 4 designates an electrical motor for assisting the steering force applied by the driver, reference numeral 5 designates a speed reducer for transmitting an output torque from the motor to the steering shaft 2, reference numeral 6 designates a vehicle speed sensor for detecting a travel speed of the vehicle, reference numeral 7 designates a battery mounted on the vehicle, and reference numeral 8 designates a controller for driving the motor 4 based on output signals from the torque sensor 3 and the vehicle speed sensor 6.

Figure 2:
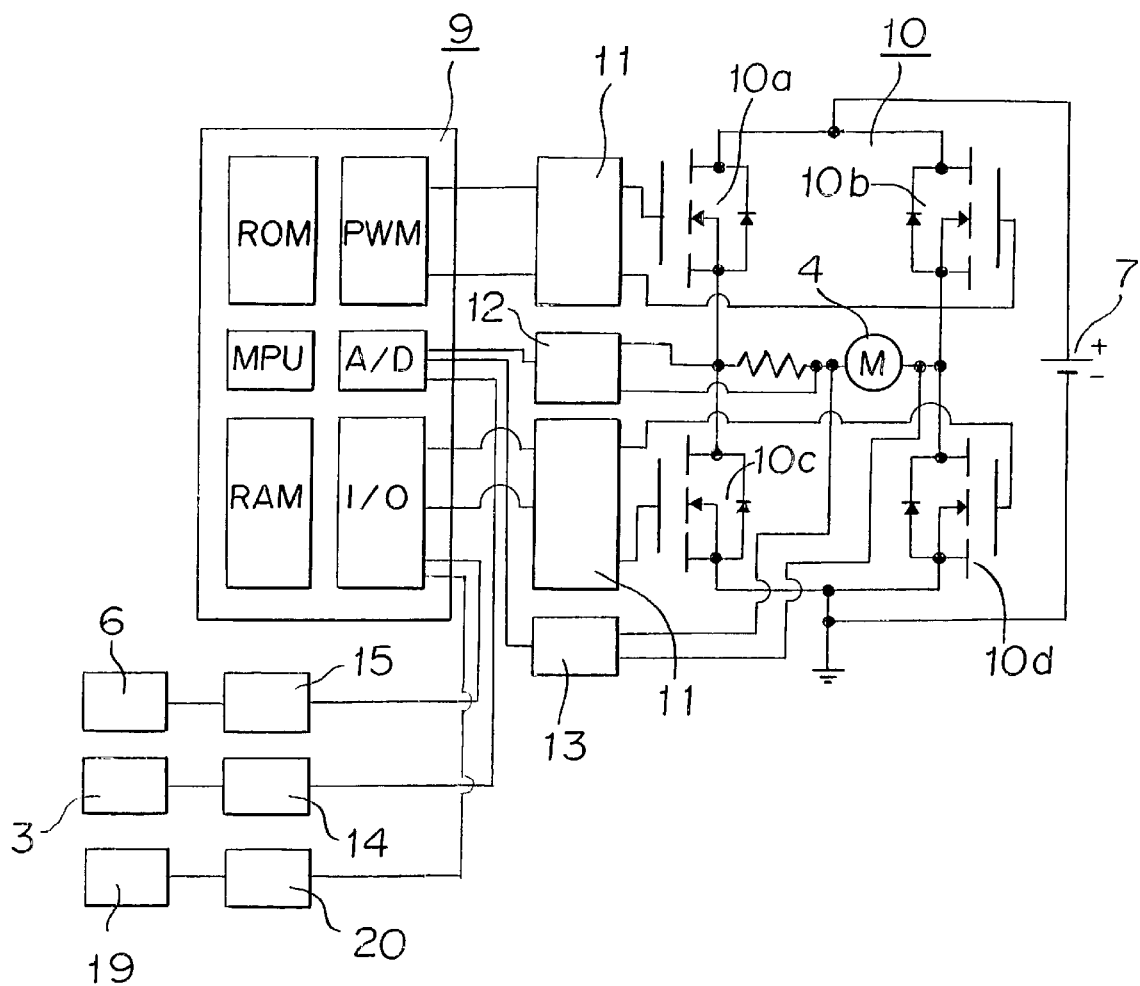
FIG. 2 is a block diagram of a controller in the electrically powered steering system according to the first embodiment.

In FIG. 2 is shown the details of the controller 8. Reference numeral 9 designates a microcontroller, which includes a microprocessor MPU, memories (ROM and RAM), input/output ports I/O, an analog-to-digital converter A/D and a pulse width modulation signal output circuit PWM. Reference numeral 10 designates a motor driving circuit, which comprises a bridge circuit of four power MOSFETs 10*a*, 10*b*, 10*c*, 10*d* (hereinbelow, referred to as the FETs). Reference numeral 11 designates gate driving circuits for driving the motor driving circuit 9, reference numeral 12 designates a motor current detecting circuit for detecting a motor current. The numeral 13 designates a motor voltage detection circuit for detecting a motor voltage. The numeral 14 designates a torque sensor signal input circuit for dealing with an output signal from the torque sensor 3. The numeral 15 designates a vehicle speed sensor signal input circuit for dealing with an output signal from the vehicle speed sensor 6.

Next, the operations of the electrically powered steering system according to the first embodiment will be explained. The microcontroller 9 performs required processes according to the program stored in a memory, and the processes are shown in the flow chart of FIG. 3.

At Step s1, an output signal from the vehicle speed sensor 6 is read out through the vehicle sensor signal input circuit 15, and an operation is performed to find a current vehicle speed. Next, Step s2 performs an operation to find a current angular speed of the motor.

The operation on the angular speed of the motor at Step s2 will be explained in detail. The motor 4 is a separately excited DC motor, wherein a voltage induced by a counter-electromotive force is proportional to an angular speed. It has been widely known that the angular speed of the motor can be found by performing an operation on the counter-electromotive force.

On the other hand, when a transient term is ignored with respect to the motor 4, the circuit equation of $Vm=Ia \cdot Ra+Ve$ holds. Vm is a motor voltage, Ia is a motor current, Ra is a motor armature resistance, and Ve is a voltage induced by a counter-electromotive force in the motor. The motor voltage Vm is detected at the motor voltage detection circuit 13, and the motor current Ia is detected at the motor current detection circuit 12. The motor armature resistance Ra is a constant value, which is determined, depending on the motor. At step s2, the induced voltage Ve is found based on an output from the motor voltage detection circuit 13 and an output from the motor current detection circuit 12 in accordance with the equation to determine the motor angular speed.

At Step s3, the motor angular speed found at Step s2 is differentiated to find a motor angular acceleration. At Step s4, it is detected whether failure occurs in the torque sensor 3, the motor 4, the vehicle speed sensor 6 and other devices or not.

Figure 4:
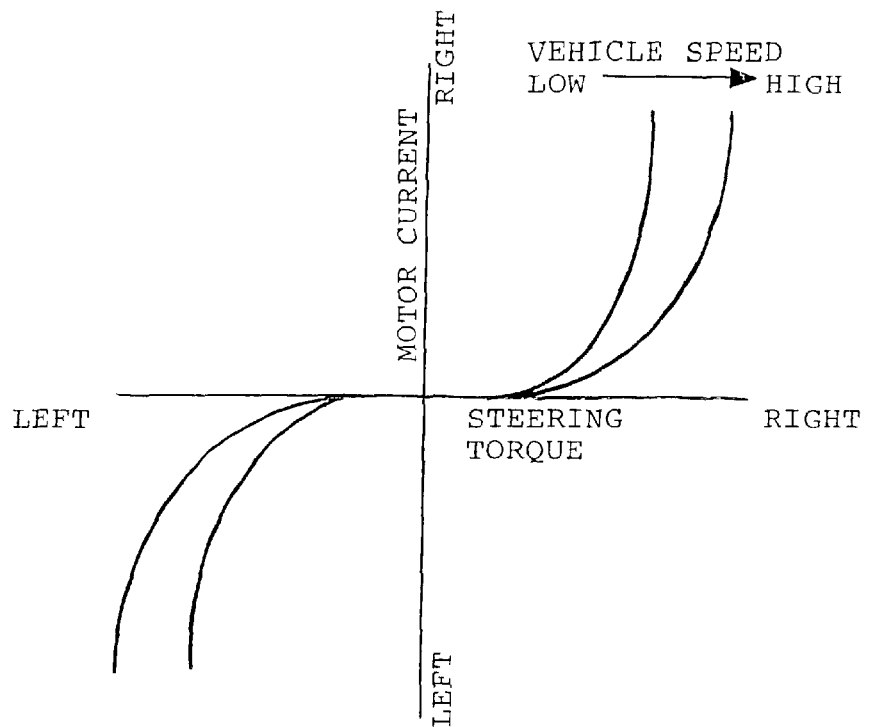
FIG. 4 is a graph to explain processes of the controller.

If it is confirmed at Step s5, based on the detection results at Step s4, that no failure occurs, the processing proceeds to Step s6. At Step s6, referring to a table stored in a memory, an operation is performed to find a steering force assisting current, which has such a certain property that the assisting current increases as the steering torque increases, and decreases as the vehicle speed increases as shown in FIG. 4 as an example. On the other hand, if it is confirmed at Step s5, based on the detection results at Step s4, that failure occurs, the processing proceeds to Step s7, where the assisting current for steering force is set at 0.

At Step s8, it is determined whether the failure detected at Step s4 occurs at the motor 4 or the motor driving circuit 10 (hereinbelow, referred to as the motor failure), or not. If negative, the processing proceeds to Step s9, where respective compensation currents that are required to compensate the inertia and the viscosity of the motor 4 affecting the steering system are found.

Figure 5:
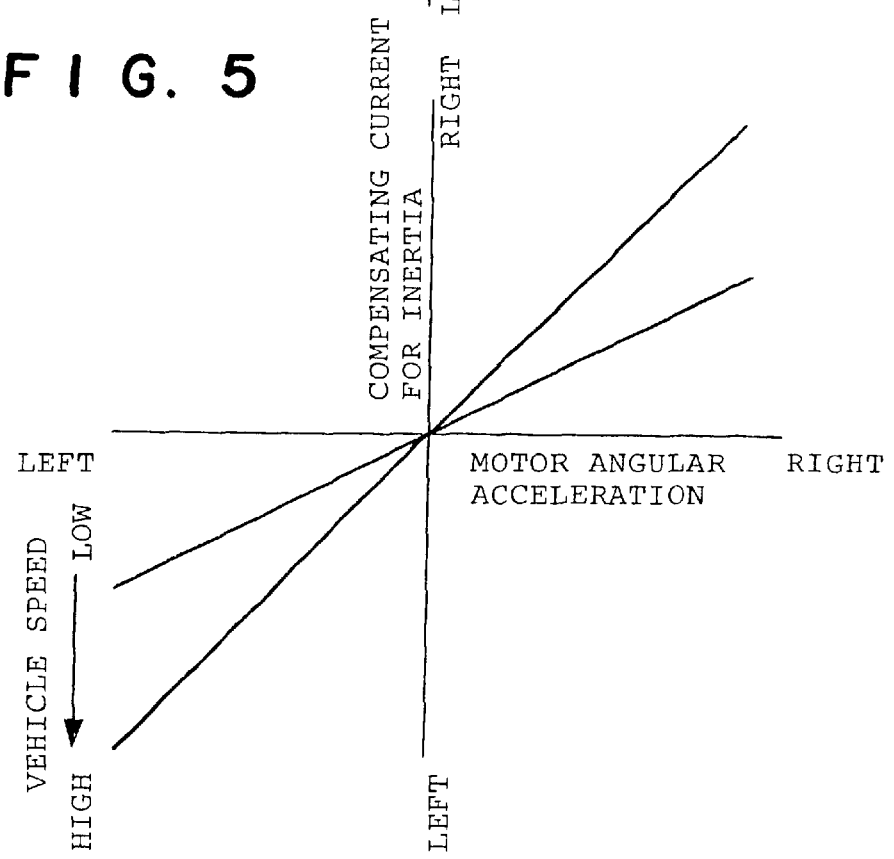
FIG. 5 is a graph to explain processes of the controller.
Figure 6:
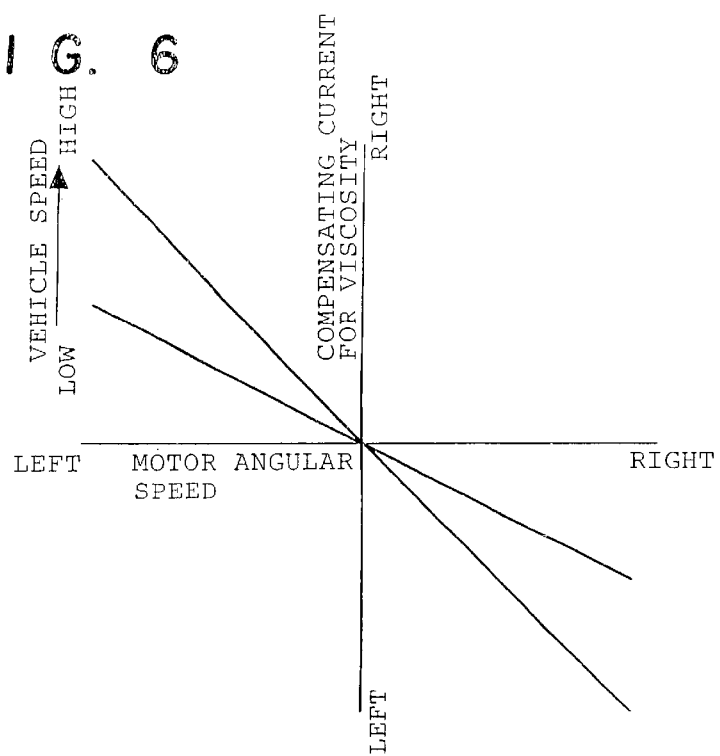
FIG. 6 is a graph to explain processes of the controller.

At Step s9, an inertia compensation current that is directly proportional to a motor angular acceleration and gives a rotational force to the motor 4 in the same direction as the motor angular acceleration as shown in FIG. 5 as an example, and a viscosity friction compensation current (hereinafter "viscosity compensation current") that is directly proportional to a motor 4 in the direction opposite to the motor angular speed as shown in FIG. 6 as an example are respectively found, referring to a table stored in a memory. On the other hand, if the motor failure occurs, the processing proceeds from Step s8 to Step s10, where the inertia compensation current and the viscosity compensation current are both set at 0.

At Step s11, a target current to the motor 4, which is found by adding the assisting current for steering force, the inertia compensation current and the viscosity compensation current thus found, is compared with the actual current to the motor detected by the motor current detection circuit 12. In addition, the gate drive circuits 11 drive the motor drive circuit 10 as to conform the actual current to the target current under feedback control. Finally, at Step s12, in order that such a series of processing is carried out at a certain cycle, the processing is kept in a stand-by condition until one cycle has passed. After one cycle has passed, the processing returns to Step s1, where the same processing is repeated.

As explained, in accordance with the first embodiment, in case of failure, the steering force assisting control, which is carried out in response to a steering torque and a vehicle speed in normal operation, can be prohibited to ensure improved safety. When the torque sensor causes failure though the motor or the motor driving circuit is in order, the compensation of inertia and viscosity for the motor can be continued to stabilize the behavior of the car and improve steering feeling even in case of failure.

When the motor or the motor driving circuit causes the failure (such as a line-to-ground fault in the motor which leads to burning of the motor by continuing the energization to the motor), the operation of the motor can be completely prohibited to ensure improved safety.

In the first embodiment stated earlier, the inertia compensation current and the viscosity compensation current are values independent of a vehicle speed. The steering feeling can be further improved by providing the inertia compensation current and the viscosity compensation current with a property to increase as the vehicle speed increases as shown in FIGS. 5 and 6.

Figure 3:
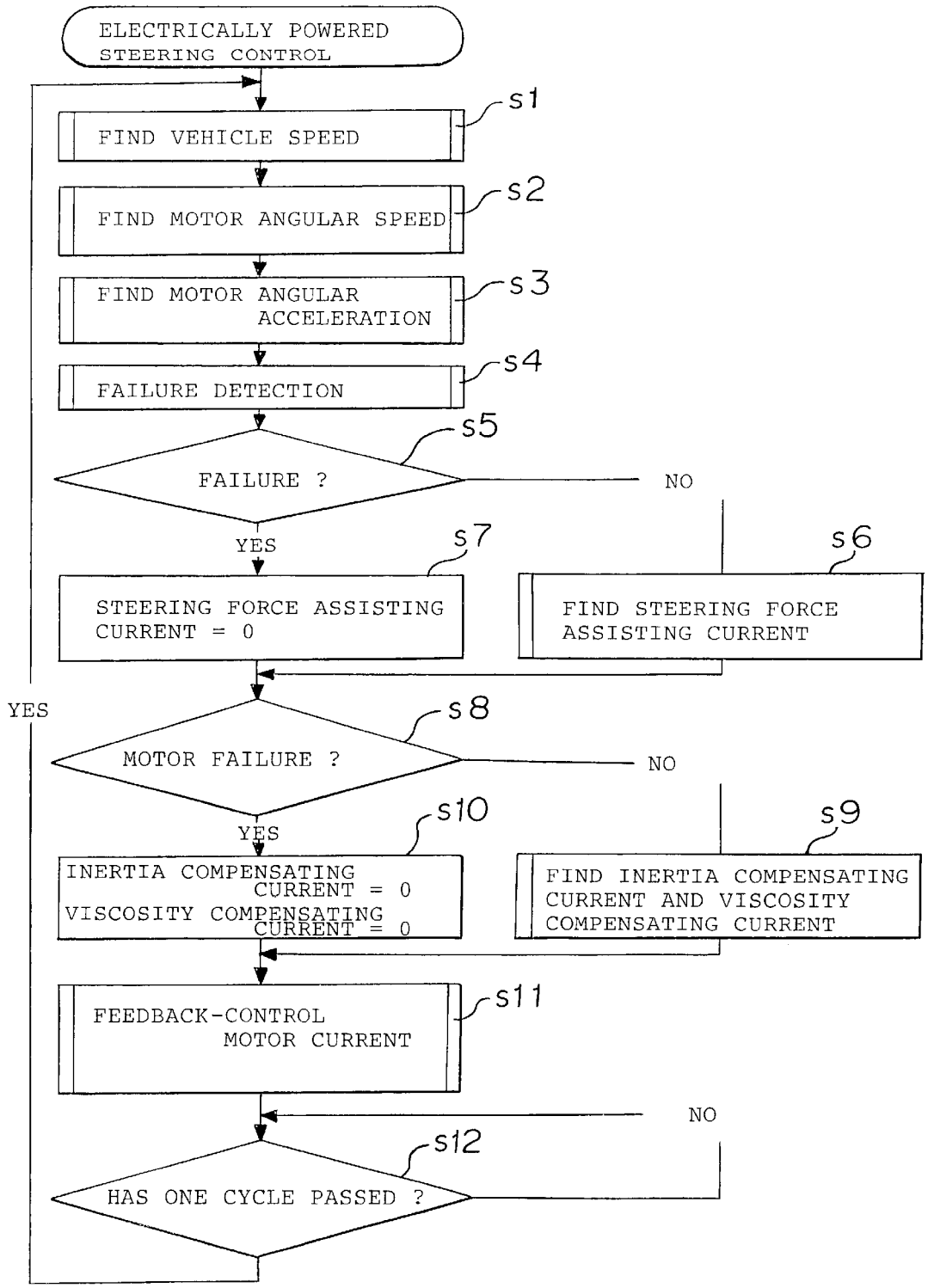
FIG. 3 is a flow chart to explain processes of the controller.

Although, at Step s7 of FIG. 3, the steering assisting current is 0 whatever failure occurs, the steering assisting current may be 0 only when failure occurs at the torque sensor, which gives the most important input in the steering force assisting control.

In case of vehicle speed sensor failure, improved safety can be ensured by finding the steering assisting current, the inertia compensation current and the viscosity compensation current, at Step s6 and Step s9 of FIG. 3, based on a certain vehicle speed in an intermediate or high speed. (This measure is safer since the steering assisting current is small while the inertia compensation current and the viscosity compensation current are great.)

When a warning light 19, which is connected to the controller through a warning light driving circuit 20 as shown in FIG. 2, is set to turn on in case of failure to provide a warning to the driver, the electrically powered steering system can be provided with further improved safety.

EMBODIMENT 2

In the first embodiment, there is provided the arrangement wherein the inertia and the viscosity of the motor are compensated, that is to say, a moment of inertia is canceled and a braking force is applied. An arrangement wherein only one of the inertia and the viscosity is compensated can also offer a similar effect. In a second embodiment, only a braking force is applied.

Figure 7:
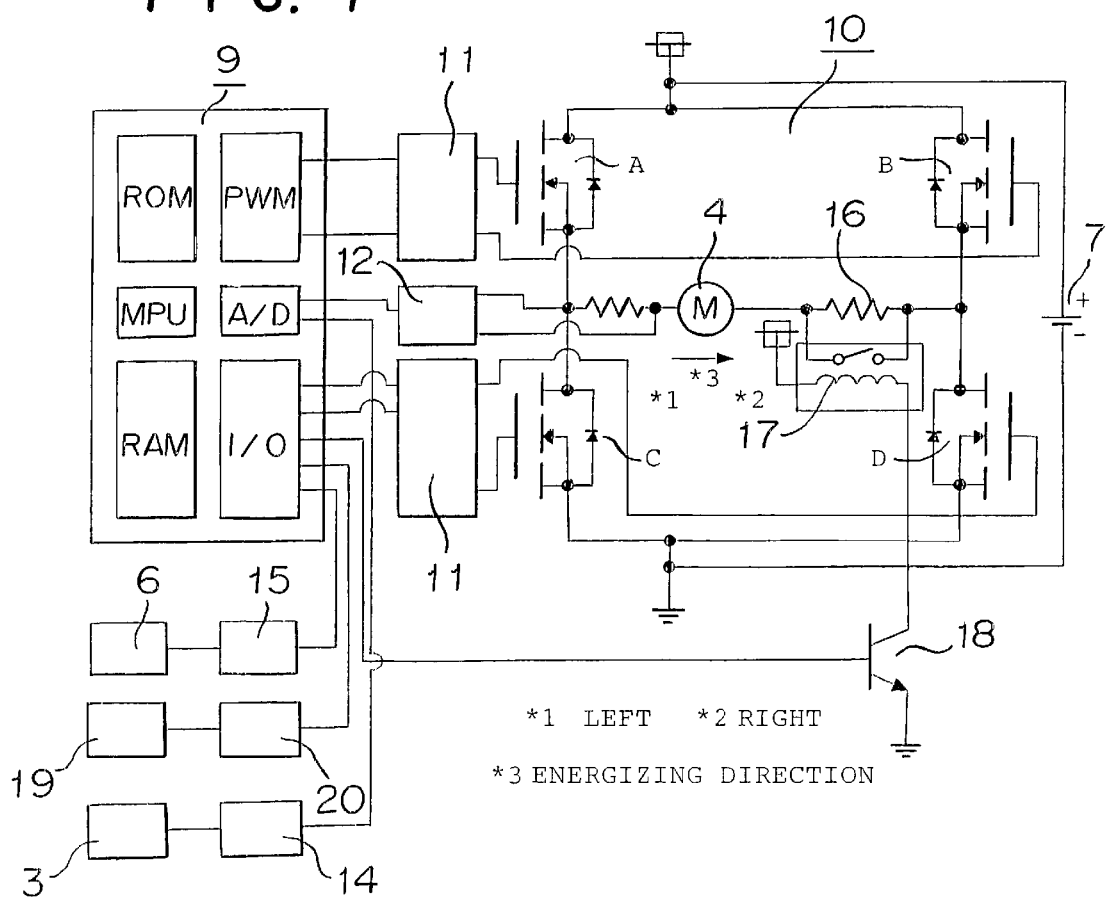
FIG. 7 is a block diagram of a controller in the electrically powered steering system according to a second embodiment of the present invention.

In FIG. 7 is shown a schematic view to explain the controller according to the second embodiment. Parts similar to those in the first embodiment are indicated by the same reference numerals, and explanation of these parts will be omitted. In this Figure, reference numeral 16 designates a braking resistor in series with the motor 4, reference numeral 17 designates a relay to short-circuit both ends of the braking resistor 16, and reference numeral 18 designates a relay driving circuit for driving the relay 17.

Figure 8:
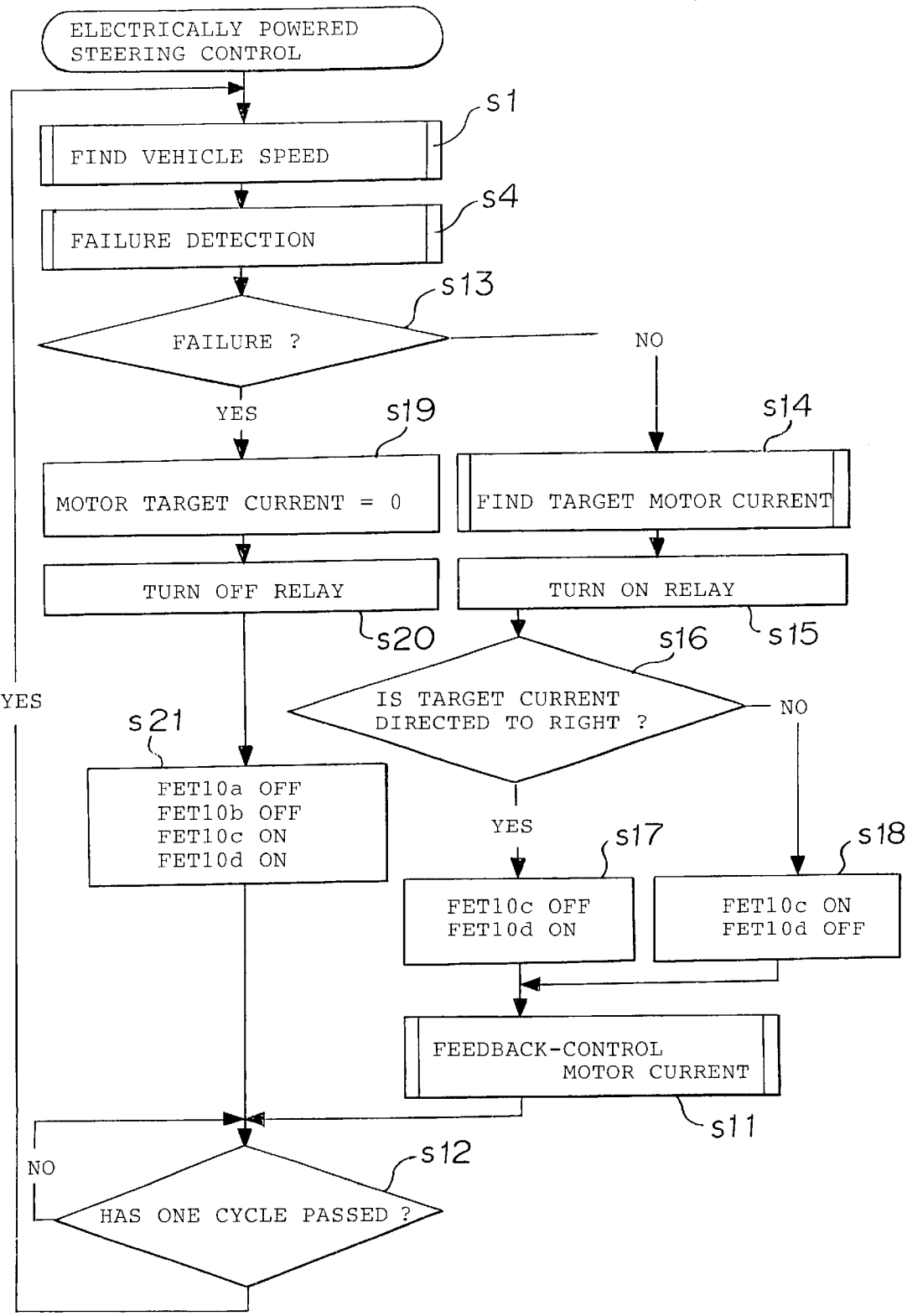
FIG. 8 is a flow chart to explain processes of a controller in the electrically powered steering system according the second embodiment.

Now, the operations according to the second embodiment will be explained, referring to the flow chart of FIG. 8. Processes identical to those in the first embodiment are indicated by the same reference numerals.

At Step s1, an output signal from the vehicle speed sensor is read out through the vehicle speed sensor input circuit 15, and an operation is performed to find a current vehicle speed. At Step s4, it is detected whether failure occurs at the torque sensor 3, the motor 4, the vehicle sensor 6 and other devices.

If it is confirmed at Step s13, based on the detection results at Step s4, that no failure occurs, the processing proceeds to Step s14. At Step s14, referring to a table stored in a memory, an operation is performed to find a steering force assisting current, which has such a certain property that the assisting current increases as the steering torque increases and decreases as the vehicle speed increases as shown in FIG. 4 as an example.

At Step s15, the relay driving circuit 18 is conducted to turn on the relay 17, short-circuiting the braking resistor 16. At Step s16, it is determined which direction the target motor current found at Step 14 is directed to.

If the target motor current is directed to the right direction in FIG. 7, the processing proceeds to Step s17, where the FET 10c turns off and the FET 10d turns on. If the target motor current is directed to the left direction in FIG. 7, the processing proceeds to Step s18, where the FET 10c turns on and the FET 10d turns off. At Step s11, a so-called feed back control is carried out to conform the actual current to the motor 4 detected by the motor current detection circuit 12 to the target current to the motor 4 found as stated earlier. Thus, a PWM (Pulse Width Modulation) duty ratio is found, and the FETs 10a and 10b are driven, depending on the rotational direction of the motor.

On the other hand, when it is detected, at Step s13, that failure occurs, the processing proceeds to Step s19, where the target current to the motor is set to 0. At Step s20, the relay driving circuit 18 is cut off to turn off the relay 17. At Step s21, the FET 10a and the FET 10b turn off, and the FET 10c and the FET 10d turn on.

Finally, at Step s12, in order that such a series of processing is carried out at a certain cycle, the processing is kept in a stand-by condition until one cycle has passed. After one cycle has passed, the processing returns to Step s1, and the same processing is repeated.

In the second embodiment as stated above, in case of failure, both of the FET 10c and the FET 10d turn on to form a closed circuit of the FET 10c, the motor 4, the braking resistor 16 and the FET 10d. When the driver operates the steering wheel, the motor 4 is rotated by the steering shaft through the speed reducer to induce a counter-electromotive force in the motor 4. The induced counter-electromotive force causes a current to flow the closed circuit to work the closed circuit as a braking circuit. Thus, a braking force can be obtained in proportion to the rotation speed of the motor 4 to eliminate an adverse effect by the moment of inertia of the motor, stabilizing the behavior of the vehicle even in case of failure.

The provision of the braking resistor in the closed circuit prevents the current from becoming greater than needed and consequently the braking force from becoming greater than needed.

Thus, the driver can have good steering feeling without being required to apply an excess steering force.

Since both of the FET 10c and the FET 10d turn on, the closed circuit can be formed independently of the steering direction to prevent the steering in the right direction and the steering in the left direction from being unbalanced and the steering feeling from degrading.

Although only one braking resistor is provided in the second embodiment, a plurality of braking resistors may be provided so as to be switched in response to, e.g., a vehicle speed, which performs a much finer fail-safe process. In this case, the braking resistors can be switched so as to have a smaller value of resistivity as the vehicle speed becomes higher. Thus, the behavior of the vehicle at a high speed can be stabilized, and the steering feeling in case of failure can be further improved.

If failure occurs at the vehicle speed sensor in the arrangement wherein the value of resistivity is modified in response to a vehicle speed, the value of resistivity can be determined based on a preset vehicle speed in an intermediate and high speed range to prevent the behavior of the vehicle from being unstable due to insufficient braking at high speed running.

When a warning light 19, which is connected to the controller through a warning light driving circuit 20 as shown in FIG. 7, turns on in case of failure to provide a warning to the driver, the electrically powered steering system can be provided with further improved safety.

EMBODIMENT 3

Although a desired braking force is applied by the braking resistor in the second embodiment, the FET 10a and the FET 10b may be driven under a PWM control by a single PWM signal in the same structure as the first embodiment in case of failure. In this case, when the FET 10a and the FET 10b turn on, the FET 10a, the motor 4 and the FET 10b can form a closed circuit to apply a braking force, stabilizing the behavior of the vehicle even in case of failure as in the second embodiment.

The third embodiment can eliminate the need for a braking resistor or a relay in comparison with the second embodiment. The third embodiment can provide an electrically powered steering system with steering feeling improved at a lower cost since the cost can be reduced.

Figure 9:
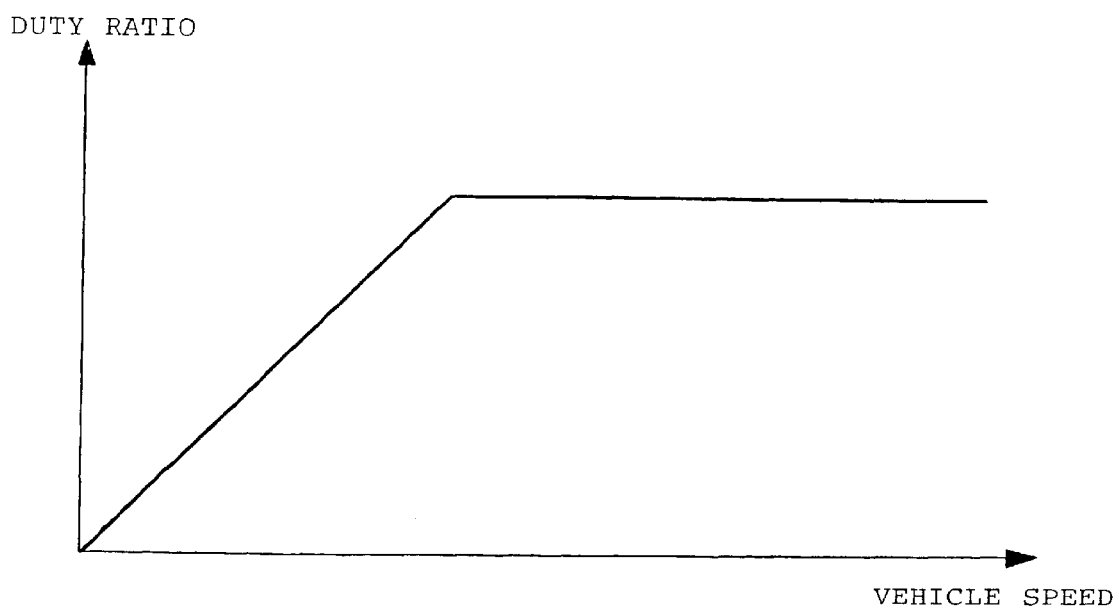
FIG. 9 is a graph to explain processes of a controller in the electrically powered steering system according to a third embodiment of the present invention.
Figure 10:
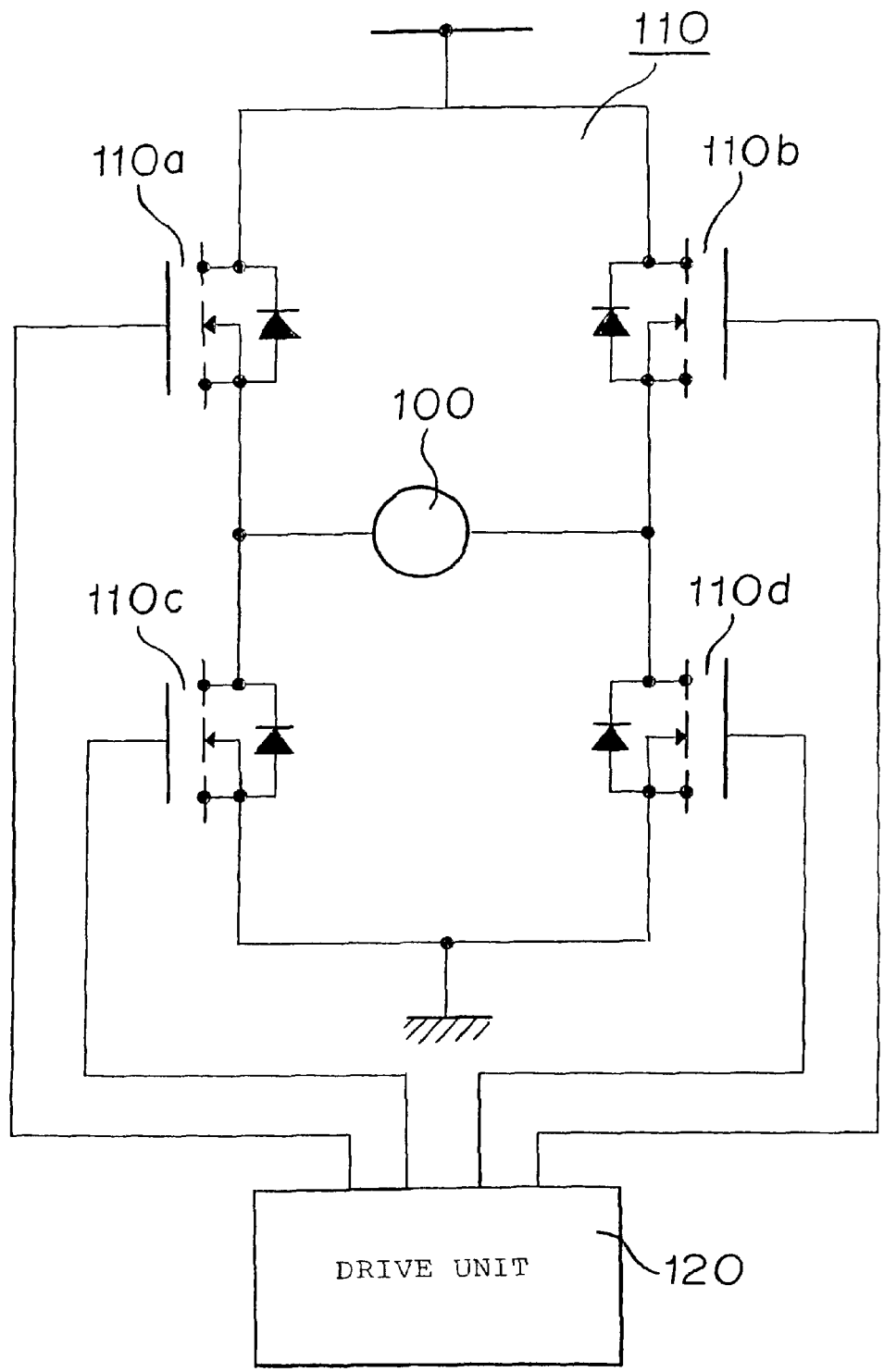
FIG. 10 is a schematic view of a typical electrically powered steering system.
Figure 11:
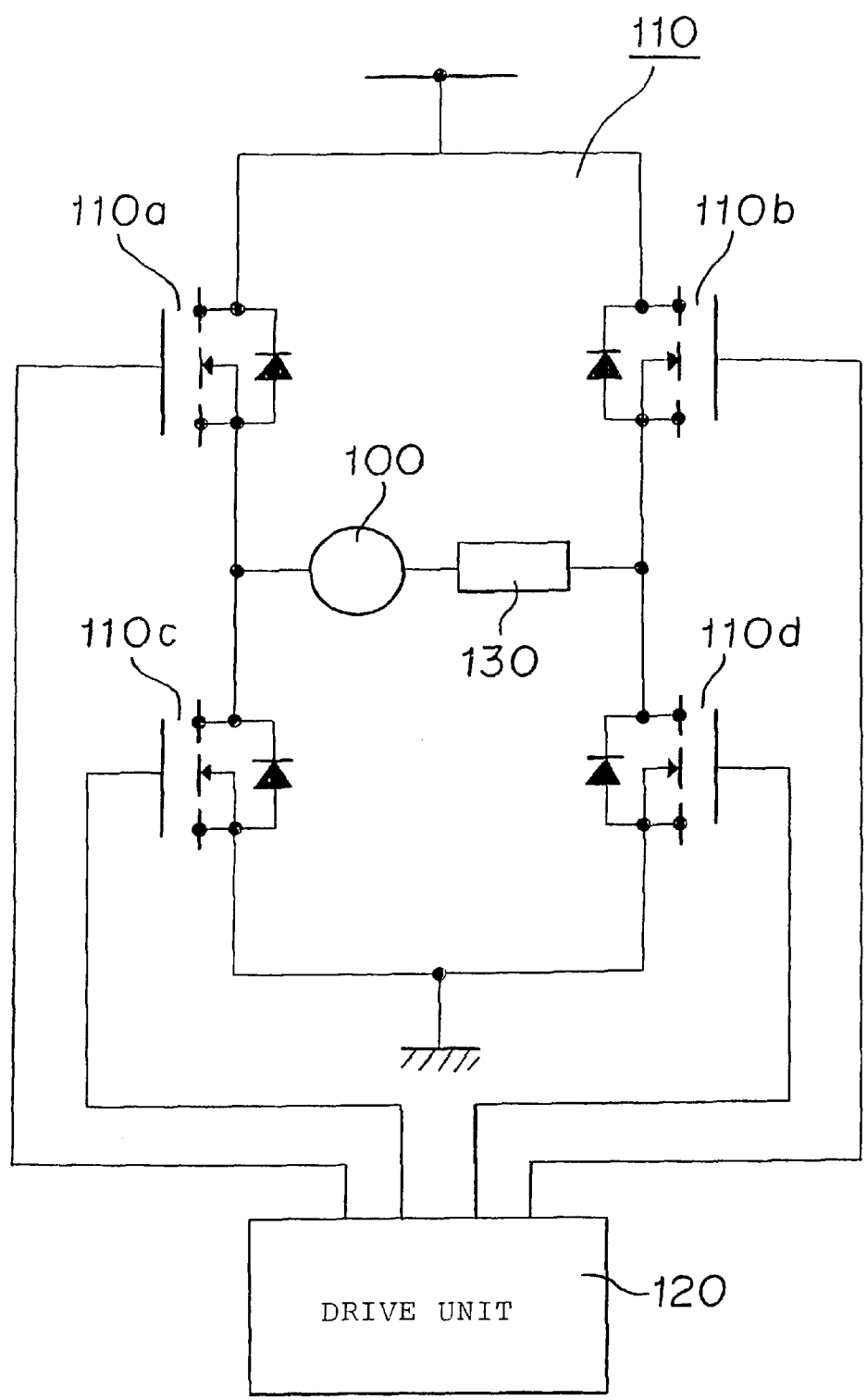
FIG. 11 is a schematic view of a conventional electrically powered steering system.

The duty ratio of a PWM signal for driving the FET 10a is set so as to become greater as a vehicle speed increases as shown in FIG. 9 as an example. By this arrangement, a desired braking force can be successively obtained in response to a vehicle speed to further improve steering feeling.

When failure occurs at the vehicle speed sensor in the arrangement wherein the duty ratio becomes greater as the vehicle speed increases, the duty ratio may be set based on a preset vehicle speed in an intermediate and high speed range to prevent the behavior of the vehicle from being unstable due to insufficient braking at high speed running.

Explanation of the third embodiment has been made in the case wherein the FET 10*a* and the FET 10*b* are both driven under a PWM control. A similar effect can be also offered by another arrangement, wherein when the FET 10*a* turns on in a state that, for instance, the FET 10*a* is set to be driven under a PWM control and the FET 10*b* turns on, the FET 10*a*, the motor 4 and the FET 10*b* form a closed circuit in order to assist a steering wheel turning in a clockwise direction, and wherein when the FET 10*b* turns on in a state that, for instance, the FET 10*b* is set to be driven under a PWM control and the FET 10*a* turns on, the FET 10*b*, the motor 4 and the FET 10*a* form a closed circuit in order to assist a steering wheel turning in a counterclockwise direction. In this arrangement, the FET that is not set to be driven under a PWM control (i.e., the FET 10*b* when the steering wheel turns in the clockwise direction, and the FET 10*a* when the steering wheel turns in the counterclockwise direction) may turn off to form a closed circuit by a parasitic diode in that FET.

When a warning light, which is connected to the controller as shown in FIGS. 2 or 7, turns on in case of failure to provide a warning to the driver, the electrically powered steering system can be provided with further improved safety.

What is claimed is:

1. An electrically powered steering system comprising:

a torque sensor for detecting a steering torque;

an electric motor for assisting a steering force based on the steering torque;

an electric motor driving circuit for driving the electric motor based on a steering force assisting current, an inertia compensation current and a viscosity friction compensation current, wherein the steering force assisting current is set to zero when a failure in the torque sensor is detected, wherein the inertia compensation current becomes greater as an angular acceleration of the electric motor increases and provides the electric motor with a torque in a direction identical to the electric motor angular acceleration, and wherein the viscosity friction compensation current increases as an angular speed of the electric motor increases and provides the electric motor with a torque in a direction opposite to the electric motor angular speed.

2. The system according to claim 1, wherein the electric motor is prohibited from operating when a failure occurs in the electric motor or the electric motor driving circuit.

3. The system according to claim 1, further comprising a vehicle speed sensor for detecting a vehicle speed, wherein at least one of the inertia compensation current and the viscosity friction compensation current is modified in response to the vehicle speed detected by the vehicle speed sensor.

4. The system according to claim 3, wherein at least one of the inertia compensation current and the viscosity friction compensation current becomes greater as the vehicle speed increases.

5. The system according to claim 4, wherein at least one of the inertia compensation current and the viscosity friction compensation current is determined based on a preset vehicle speed in case of failure at the vehicle speed sensor.

6. The system according to claim 1, further comprising an alarm for providing a warning indication in case of the failure in the torque sensor.

7. An electrically powered steering system comprising:

a torque sensor for detecting a steering torque;

a vehicle speed sensor for detecting a vehicle speed;

an electric motor for assisting a steering force based on the steering torque;

an electric motor driving circuit for driving the electric motor, the electric motor driving circuit comprising a bridge circuit including four switching devices, and a braking resistor circuit connected in series between the motor and the bridge circuit, and a switch connected in parallel to the braking resistor circuit, wherein the switch is closed for bypassing the braking resistor circuit in normal operation and the switch is open when a failure is detected in at least one of the torque sensor, the vehicle speed sensor, the electric motor and the electric motor driving circuit.

8. The system according to claim 7, wherein the braking resistor circuit has a value of resistivity which is modified in response to the vehicle speed detected by the vehicle speed sensor.

9. The system according to claim 8, wherein the value of resistivity becomes smaller as the vehicle speed increases.

10. The system according to claim 9, wherein the value of resistivity is determined based on a preset vehicle speed in case of failure at the vehicle speed sensor.

11. The system according to claim 7, further comprising an alarm for providing a warning indication in case of the failure in the torque sensor, the vehicle speed sensor, the electric motor or electric motor driving circuit.

12. An electrically powered steering system comprising:

a vehicle speed sensor for detecting a vehicle speed;

a torque sensor for detecting a steering torque;

an electric motor for assisting a steering force based on a steering torque; and an electric motor driving circuit for driving the electric motor, the electric motor driving circuit comprising a bridge circuit including four switching devices, wherein two of said switching devices are controllably driven by a duty signal in order to short circuit terminals of the electric motor when a failure is detected in at least one of the electric motor, the electric motor driving circuit, the vehicle speed sensor and the torque sensor.

13. The system according to claim 12, wherein the duty signal has a duty ratio modified in response to the detected vehicle speed.

14. The system according to claim 13, wherein the duty ratio becomes greater as the vehicle speed increases.

15. The system according to claim 14, wherein the duty ratio is determined based on a preset vehicle speed in case of failure at the vehicle speed sensor.

16. The system according to claim 12, further comprising an alarm for providing a warning indication in case of the failure in the torque sensor, the vehicle speed sensor, the electric motor or electric motor driving circuit.

17. An electrically powered steering system comprising:

a vehicle speed sensor for detecting a vehicle speed;

a torque sensor for detecting a steering torque;

an electric motor for assisting a steering force based on the steering torque;

an electric motor driving circuit for driving the electric motor; and a controller for determining a motor target current for the electric motor based on a steering force assisting current, an inertia compensation current and a viscosity friction compensation current, and controlling the electric motor driving circuit based on the motor target current, wherein the steering force assisting current is set to zero when a failure is detected in at least one of the electric motor, the electric motor driving circuit, the vehicle speed sensor and the torque sensor, wherein the inertia compensation current increases as an angular acceleration of the electric motor increases and provides the electric motor with a torque in a direction identical to the electric motor angular acceleration, and wherein the viscosity friction compensation current increases as an angular speed of the electric motor increases and provides the electric motor with a torque in a direction opposite to the electric motor angular speed.

18. The system according to claim 17, wherein the controller sets the inertia compensating current and the viscosity friction compensating current to zero when a failure is detected in the electric motor or the motor driving circuit so that the electric motor is prohibited from operating.

19. The system according to claim 17, wherein at least one of the inertia compensation current and the viscosity compensation current is modified in response to the vehicle speed detected by the vehicle speed sensor.

\* \* \* \* \*